US009317980B2

(12) United States Patent
Cook et al.

(10) Patent No.: US 9,317,980 B2
(45) **Date of Patent: *Apr. 19, 2016**

(54) DRIVER RISK ASSESSMENT SYSTEM AND METHOD HAVING CALIBRATING AUTOMATIC EVENT SCORING

(71) Applicant: DriveCam, Inc., San Diego, CA (US)

(72) Inventors: Bryon Cook, San Diego, CA (US); Louis Gilles, San Diego, CA (US)

(73) Assignee: Lytx, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/923,130

(22) Filed: Jun. 20, 2013

(65) Prior Publication Data

US 2013/0345927 A1 Dec. 26, 2013

Related U.S. Application Data

(63) Continuation of application No. 12/814,117, filed on Jun. 11, 2010, now Pat. No. 8,508,353, which is a continuation-in-part of application No. 12/359,787, filed on Jan. 26, 2009, now Pat. No. 8,269,617, and a continuation-in-part of application No. 12/691,639, filed on Jan. 21, 2010, now Pat. No. 8,849,501.

(51) Int. Cl.
*B60Q 1/00* (2006.01)
*G07C 5/08* (2006.01)

(52) U.S. Cl.
CPC .................................... *G07C 5/085* (2013.01)

(58) Field of Classification Search
None
See application file for complete search history.

(56) References Cited

U.S. PATENT DOCUMENTS

| | | | | |
|---|---|---|---|---|
| 5,532,678 | A | 7/1996 | Kin et al. | |
| 5,574,424 | A | 11/1996 | Nguyen | |
| 5,706,909 | A | 1/1998 | Bevins et al. | |
| 5,825,284 | A | 10/1998 | Dunwoody et al. | |
| 6,163,749 | A | 12/2000 | McDonough et al. | |
| 7,471,189 | B2 | 12/2008 | Vastad et al. | |
| 7,940,250 | B2 | 5/2011 | Forstall | |
| 8,140,358 | B1 | 3/2012 | Ling et al. | |
| 8,311,858 | B2 | 11/2012 | Everett et al. | |
| 8,417,562 | B1 * | 4/2013 | Siemens | 705/7.38 |
| 8,508,353 | B2 | 8/2013 | Cook et al. | |
| 8,775,067 | B2 | 7/2014 | Cho | |
| 2001/0052730 | A1 | 12/2001 | Baur et al. | |
| 2002/0111725 | A1 | 8/2002 | Burge | |

(Continued)

*Primary Examiner* — Julie Lieu
(74) *Attorney, Agent, or Firm* — Van Pelt, Yi & James LLP

(57) ABSTRACT

A Driver Risk Assessment System and Method Having Calibrating Automatic Event Scoring is disclosed. The system and method provide robust and reliable event scoring and reporting, while also optimizing data transmission bandwidth. The system includes onboard vehicular driving event detectors that record data related to detected driving events and selectively store or transfer data related to said detected driving events. If elected, the onboard vehicular system will score a detected driving event, compare the local score to historical values previously stored within the onboard system, and upload selective data or data types to a remote server or user if the system concludes that a serious driving event has occurred. Importantly, the onboard event scoring system, if enabled, will continuously evolve and improve in its reliability by being periodically re-calibrated with the ongoing reliability results of manual human review of automated predictive event reports. The system may further respond to independent user requests by transferring select data to said user at a variety of locations and formats.

17 Claims, 10 Drawing Sheets

(56) References Cited

U.S. PATENT DOCUMENTS

| | | | | |
|---|---|---|---|---|
| 2002/0163532 | A1 | 11/2002 | Thomas et al. | |
| 2004/0064245 | A1 | 4/2004 | Knockeart et al. | |
| 2004/0153362 | A1 | 8/2004 | Bauer et al. | |
| 2004/0203903 | A1 | 10/2004 | Wilson et al. | |
| 2004/0236474 | A1 | 11/2004 | Chowdhary et al. | |
| 2005/0065682 | A1 | 3/2005 | Kapadia et al. | |
| 2005/0073585 | A1 | 4/2005 | Ettinger et al. | |
| 2005/0137757 | A1 | 6/2005 | Phelan et al. | |
| 2006/0053038 | A1 | 3/2006 | Warren et al. | |
| 2006/0200008 | A1* | 9/2006 | Moore-Ede | 600/300 |
| 2007/0043487 | A1 | 2/2007 | Krzystofczyk et al. | |
| 2007/0257815 | A1 | 11/2007 | Gunderson et al. | |
| 2008/0234920 | A1 | 9/2008 | Nurminen | |
| 2009/0138191 | A1 | 5/2009 | Engelhard | |
| 2009/0312998 | A1 | 12/2009 | Berckmans et al. | |
| 2010/0049516 | A1 | 2/2010 | Talwar et al. | |
| 2010/0153146 | A1 | 6/2010 | Angell et al. | |
| 2010/0191411 | A1 | 7/2010 | Cook et al. | |
| 2010/0250020 | A1 | 9/2010 | Lee et al. | |
| 2010/0312464 | A1 | 12/2010 | Fitzgerald et al. | |
| 2011/0112995 | A1* | 5/2011 | Chang et al. | 706/12 |
| 2011/0140884 | A1 | 6/2011 | Santiago et al. | |
| 2011/0161116 | A1* | 6/2011 | Peak et al. | 705/4 |
| 2011/0213628 | A1* | 9/2011 | Peak et al. | 705/4 |
| 2011/0257882 | A1 | 10/2011 | McBurney et al. | |
| 2012/0078063 | A1* | 3/2012 | Moore-Ede | 600/300 |
| 2012/0190001 | A1* | 7/2012 | Knight et al. | 434/362 |
| 2014/0280204 | A1* | 9/2014 | Avery et al. | 707/748 |

* cited by examiner

DRIVER RISK ASSESSMENT SYSTEM AND METHOD HAVING CALIBRATING AUTOMATIC EVENT SCORING

CROSS REFERENCE TO OTHER APPLICATIONS

This application is a continuation of U.S. patent application Ser. No. 12/814,117, now U.S. Pat. No. 8,508,353, entitled DRIVER RISK ASSESSMENT SYSTEM AND METHOD HAVING CALIBRATING AUTOMATIC EVENT SCORING filed Jun. 11, 2010, which is incorporated herein by reference for all purposes; which is a continuation in part of U.S. patent application Ser. No. 12/359,787, now U.S. Pat. No. 8,269,617, entitled METHOD AND SYSTEM FOR TUNING THE EFFECT OF VEHICLE CHARACTERISTICS ON RISK PREDICTION filed Jan. 26, 2009, which is incorporated herein by reference for all purposes; and a continuation in part of co-pending U.S. patent application Ser. No. 12/691,639, now U.S. Pat. No. 8,849,501, entitled DRIVER RISK ASSESSMENT SYSTEM AND METHOD EMPLOYING SELECTIVELY AUTOMATIC EVENT SCORING filed Jan. 21, 2010, which is incorporated herein by reference for all purposes.

This application is an improvement upon the systems, methods and devices previously disclosed in application Ser. No. 11/382,222, now U.S. Pat. No. 7,659,827, filed May 8, 2006, Ser. No. 11/382,239, now U.S. Pat. No. 8,314,708, filed May 8, 2006, Ser. No. 11/566,539 filed Dec. 4, 2006, Ser. No. 11/467,694, now U.S. Pat. No. 8,373,567, filed Aug. 28, 2006, Ser. No. 11/382,328 filed May 9, 2006, Ser. No. 11/382,325 filed May 9, 2006, Ser. No. 11/465,765 filed Aug. 18, 2006, Ser. No. 11/467,486 filed Aug. 25, 2006, Ser. No. 11/566,424, now U.S. Pat. No. 7,804,426, filed Dec. 4, 2006, Ser. No. 11/566,526, now U.S. Pat. No. 7,536,457, filed Dec. 4, 2006, and Ser. No. 12/359,787, now U.S. Pat. No. 8,269,617, filed Jan. 26, 2009 (the "Prior Applications"), and as such, the discloses of those Prior Applications are incorporated herein by reference.

BACKGROUND OF THE INVENTION

1. Field of the Invention

This invention relates generally to systems for analyzing driving events and risk and, more specifically, to a Driver Risk Assessment System and Method Having Calibrating Automatic Event Scoring.

2. Description of Related Art

The surveillance, analysis and reporting of vehicular accidents and "events" has, for some time, been the focus of numerous inventive and commercial efforts. These systems seek to monitor a vehicle's condition while being driven by a driver, and then record and report whenever a "hazardous" condition is detected. What vehicle (and/or driver) symptoms are to constitute a "hazardous" event or condition is defined in the context of a particular monitoring system. Each system will monitor one or more sensor devices located in the vehicle (e.g., shock sensors, location sensors, attitude/orientation sensors, sound sensors), and will generally apply a threshold alarm level (of a variety of levels of sophistication) to the sensor(s) output to assign an event or a non-event. Prior systems of note include the following patents and printed publications: Guensler, et al., US2007/0216521 describes a "Real-time Traffic Citation Probability Display System and Method" that incorporates environmental factors and geocentric risk elements to determine driver risk of citation in real-time. Gunderson, et al., US2007/0257804 describes a "System and Method for Reducing Driving Risk with Foresight." The Gunderson system and method introduces driver coaching into the driver risk analysis system and method. Warren, et al., US2007/0027726 is a system for "Calculation of Driver Score Based on Vehicle Operation for Forward looking Insurance Premiums." Warren calculates insurance premiums using geomapping to subdivide underwriting areas. Gunderson, et al., US2007/0271105 is a "System and Method for Reducing Risk with Hindsight" that provides forensic analysis of a vehicle accident, including video of the driver and area in front of the vehicle. Gunderson, et al., US2007/0268158 is a "System and Method for Reducing Driving Risk with Insight." This Gunderson method and system monitors driving for the purpose of analyzing and reporting events on a driver-centric basis. Gunderson, et al., US2007/0257815 is a "System and Method for Taking Risk out of Driving," and introduces the creation of a driver coaching session as part of the driving monitoring system. Warren, et al., US2006/0253307 describes "Calculation of Driver Score based on Vehicle Operation" in order to assess driver risk based upon a vehicle/driver geolocation and duration in risky locations. Warren, et al., US2006/0053038 is related to the '307 Warren, that further includes activity parameters in determining driver risk. Kuttenberger, et al. U.S. Pat. No. 7,822,521 is a "Method and Device for Evaluating Driving Situations." This system does calculate driving risk based upon accelerometers and other vehicle characteristics. Finally, Kubo, et al., U.S. Pat. No. 7,676,306 is a "Vehicle Behavior Analysis System" that includes GPS, video and onboard triggers for notification/storing/uploading data related to the vehicle behavior.

There are other prior references dealing with the analysis of the detected data to identify occurrences that would be classified as "driving events" of significance to the driver or driver's supervisory organization. These references include: Raz, et al. U.S. Pat. No. 7,389,178 for "System and Method for Vehicle Driver Behavior Analysis and Evaluation", Raz. et al., U.S. Pat. No. 7,561,054 for "System and Method for Displaying a Driving Profile," and Raz. et al., U.S. Patent Application Publication No. 2007/0005404 for "System and Method for Providing Driving Insurance." All of these Raz references are based upon a system and method that analyzes the raw data collected by the vehicle data sensors and generates a "string" of "maneuvers" that the system recognizes from a database of data that has been previously identified as representing such maneuvers.

A detailed review of each of these prior systems has been conducted, and while each and every one of them discloses what is purported to be a novel system for vehicle risk monitoring, reporting and/or analysis, none of these prior systems suggests a system that employs an operational architecture that provides customer users a variety of reporting and review options, including automated event scoring, manual event scoring and even no event scoring (i.e., predictive event scoring only).

SUMMARY OF THE INVENTION

In light of the aforementioned problems associated with the prior systems and methods, it is an object of the present invention to provide a Driver Risk Assessment System and Method Having Calibrating Automatic Event Scoring. The system and method should provide robust and reliable event scoring and reporting, while also optimizing data transmission bandwidth. The system should include onboard vehicular driving event detectors that record data related to detected driving events, and selectively store or transfer data related to said detected driving events. If elected, the onboard vehicular system should "score" a detected driving event, compare the local score to historical values previously stored within the onboard system, and upload selective data or data types if the system concludes that a serious driving event has occurred. Importantly, the onboard event scoring system should continuously evolve and improve in its reliability by regularly being re-calibrated with the ongoing results of manual human review of automated predictive event reports. The system should respond to independent user requests by transferring select data to said user at a variety of locations and formats.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings, of which:

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a Driver Risk Assessment System and Method Having Calibrating Automatic Event Scoring.

Figure 1:
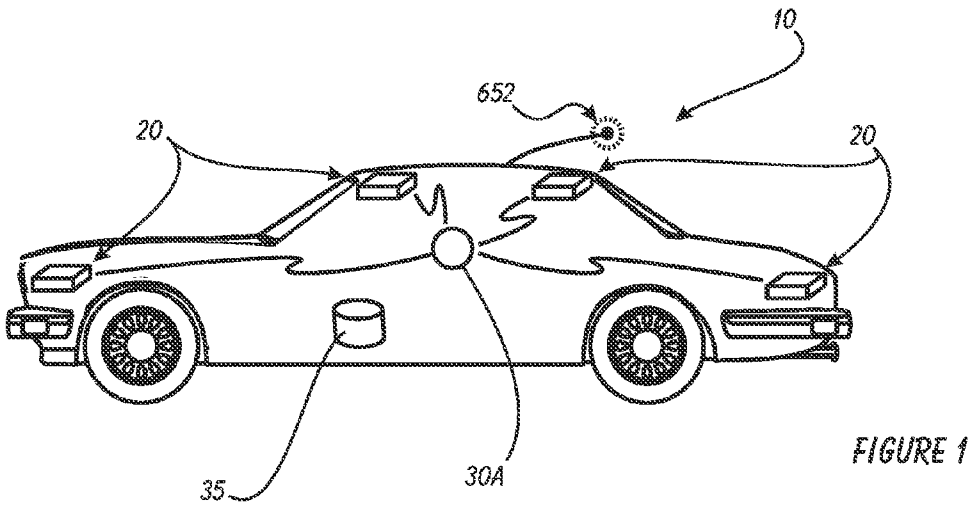
FIG. 1 is a block diagram of a conventional vehicle having a preferred embodiment of the system of the present invention installed therein.

The present invention can best be understood by initial consideration of FIG. 1. FIG. 1 is a block diagram of a conventional vehicle 10 having a preferred embodiment of the system of the present invention installed therein. The event detector 3OA is in control of one or more event capture devices 20 that are attached to the vehicle 10. The event detector 30A communicates with the capture devices 20 via a wired or wireless interface. There is a data storage area 35 also associated with the event detector 30A, as will be expanded upon below in connection with other drawing figures.

The event detector 30A can be any of a variety of types of computing devices with the ability to execute programmed instructions, receive input from various sensors, and communicate with one or more internal or external event capture devices 20 and other external devices (not shown). The detector 30A may utilize software, hardware and/or firmware in a variety of combinations to execute the instructions of the disclosed method.

An example general purpose computing device that may be employed as all or a portion of an event detector 30A is later described in connection with the discussion related to FIG. 3, hereinbelow. Similarly, an example general purpose wireless communication device that may be employed as all or a portion of an event detector 30A is later described in connection with the discussion related to FIG. 4 hereinbelow.

When the event detector 30A identifies an event, the event detector 30A instructs the one or more event capture devices 20 to record pre-event data, during the event data, and post-event data that is then provided to the event detector 30A and stored in the data storage area 35. In reality, the event capture devices 20 constantly save data in a buffer memory, which allows the system to actually obtain data that was first-recorded (into a buffer memory) prior to the event itself.

Events may comprise a variety of situations, including automobile accidents, reckless driving, rough driving, or any other type of stationary or moving occurrence that the owner of a vehicle 10 may desire to know about, and is more fully described below in connection with other drawing figures.

The vehicle 10 may have a plurality of event capture devices 20 placed in various locations around the vehicle 10. An event capture device 20 may comprise a video camera, still camera, microphone, and other types of data capture devices. For example, an event capture device 20 may include an accelerometer that senses changes in speed, direction, and vehicle spatial orientation. Additional sensors and/or data capture devices may also be incorporated into an event capture device 20 in order to provide a rich set of information about a detected event.

The data storage area 35 can be any sort of internal or external, fixed or removable memory device and may include both persistent and volatile memories. The function of the data storage area 35 is to maintain data for long term storage and also to provide efficient and fast access to instructions for applications or modules that are executed by the event detector 30A.

Figure 2:
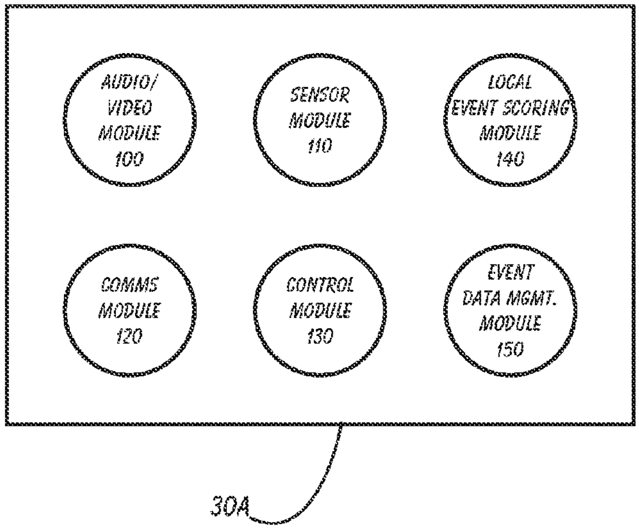
FIG. 2 is a block diagram illustrating an example event detector according to an embodiment of the present invention.

In one embodiment, event detector 30A in combination with the one or more event capture devices 20 identifies an event and stores certain audio and video data along with related information about the event For example, related information may include the speed of the vehicle when the event occurred, the direction the vehicle was traveling, the location of the vehicle (e.g., from a global positioning system "GPS" sensor), and other information from sensors located in and around the vehicle or from the vehicle itself (e.g., from a data bus integral to the vehicle such as an on board diagnostic "OBD" vehicle bus). This combination of audio, video, and other data is compiled into an event that can be stored in data storage 35 onboard the vehicle for later delivery to an evaluation server. Data transfer to a remote user or server could be via a conventional wired connection, or via conventional wireless connections (such as using antennae 652). Turning to FIG. 2, we can examine some of the internal details regarding the event detector 30A.

FIG. 2 is a block diagram illustrating an example event detector 30A according to an embodiment of the present invention. In the illustrated embodiment, the event detector 30A comprises an audio/video ("AV") module 100, a sensor module 110, a communication module 120, a control module 130, and a spatial behavior module (not shown). Additional modules may also be employed to carry out the various functions of the event detector 30A, as will be understood by those having skill in the art.

The AV module 100 is configured to manage the audio and video input from one or more event capture devices and storage of the audio and video input. The sensor module 110 is configured to manage one or more sensors that can be integral to the event detector 30A or external from the event detector 30A. For example, an accelerometer may be integral to the event detector 30A or it may be located elsewhere in the vehicle 10. The sensor module 110 may also manage other types of sensor devices such as a GPS sensor, temperature sensor, moisture sensor, and the OBD, or the like (all not shown).

The communication module 120 is configured to manage communications between the event detector 30A and other devices and modules. For example, the communication module 120 may handle communications between the event detector 30A and the various event capture devices 20. The communication module 120 may also handle communications between the event detector 30A and a memory device, docking station, or a server such as an evaluation server. The communication module 120 is configured to communicate with these various types of devices and other types of devices via a direct wire link (e.g., USB cable, firewire cable), a direct wireless link (e.g., infrared, Bluetooth, ZigBee), or a wired or any wireless network link such as a local area network ("LAN"), a wide area network ("WAN"), a wireless wide area network ("WWAN"), an IEEE 802 wireless network such as an IEEE 802.16 ("WiFi") network, a WiMAX network, satellite network, or a cellular network. The particular communications mode used will determine which, if any, antennae 652 is used.

The control module 130 is configured to control the actions or remote devices such as the one or more event capture devices. For example, the control module 130 may be configured to instruct the event capture devices to capture an event and return the data to the event detector when it is informed by the sensor module 110 that certain trigger criteria have been met that identify an event.

A pair of subsystems are new to this embodiment of the event detector 30A, the Local Event Scoring Module 140 and the Event Data Management Module 150. While these two modules 140, 150 are referred to as separate subsystems, it should be understood that some or all of the functionality of each could be integrated into the Control Module 130 (or other subsystem associated with the event detector 30A).

The Local Event Scoring Module 140 will review the raw data streams from the individual sensors 20 (see FIG. 1), or the sensor module 110, and will use one or more mathematic algorithms to calculate a local event score. While this local event score is not expected to be as robust or potentially accurate as the remote event scoring system described by the Parent Applications, it is not necessarily a requirement that this be the case, because a remote score may still be determined independent of the local score. The purpose for calculating the local event score is to enable the event detector 30A to optimize the use of the data transfer bandwidth by only selectively uploading the full event data to the remote server for review/display/analysis. Through extensive observation, the values produced by the various sensors (either alone or in combination) can be analyzed mathematically to produce a product that accurately predicts whether or not a serious accident or other driving event has occurred. Combinations of acceleration, velocity, video and event sound can reliably detect that an accident has happened.

If the local event scoring module 140 determines that the local event score of a particular driving event meets predetermined criteria, it will direct the Event Data Management Module 150 to upload the appropriate data received from the sensors 20 (see FIG. 1) and stored locally within the vehicle (within a storage device associated with the event detector 30A).

The Event Data Management Module 150 may also be responsive to a remote request for additional data. For example, in circumstances where the remote user (i.e., remote to the vehicle being monitored) may receive a notice of a particular "incident" of interest, that remote user may be able to manually request audio, video or other locally-recorded data. This requested data would then be transmitted (via the communications module 120) to the remote user for review/analysis/display.

This new version of event detector 30A has the ability to reduce or at least regulate the amount of data that flows from it to the remote user(s). When fully enabled, for example, large bandwidth data streams such as video and audio data will not regularly be transmitted to the remote server unless by direction of either the Local Event Scoring Module 140, or by manual or remote user request. This reduction of flow translates into significant cost savings, since most of these systems utilize expensive cellular telephone or satellite networks for vehicle-to-remote server communications. FIGS. 3 and 4 depict conventional hardware used to construct the functional elements of the Event Detector 30A and associated subsystems.

Figure 3:
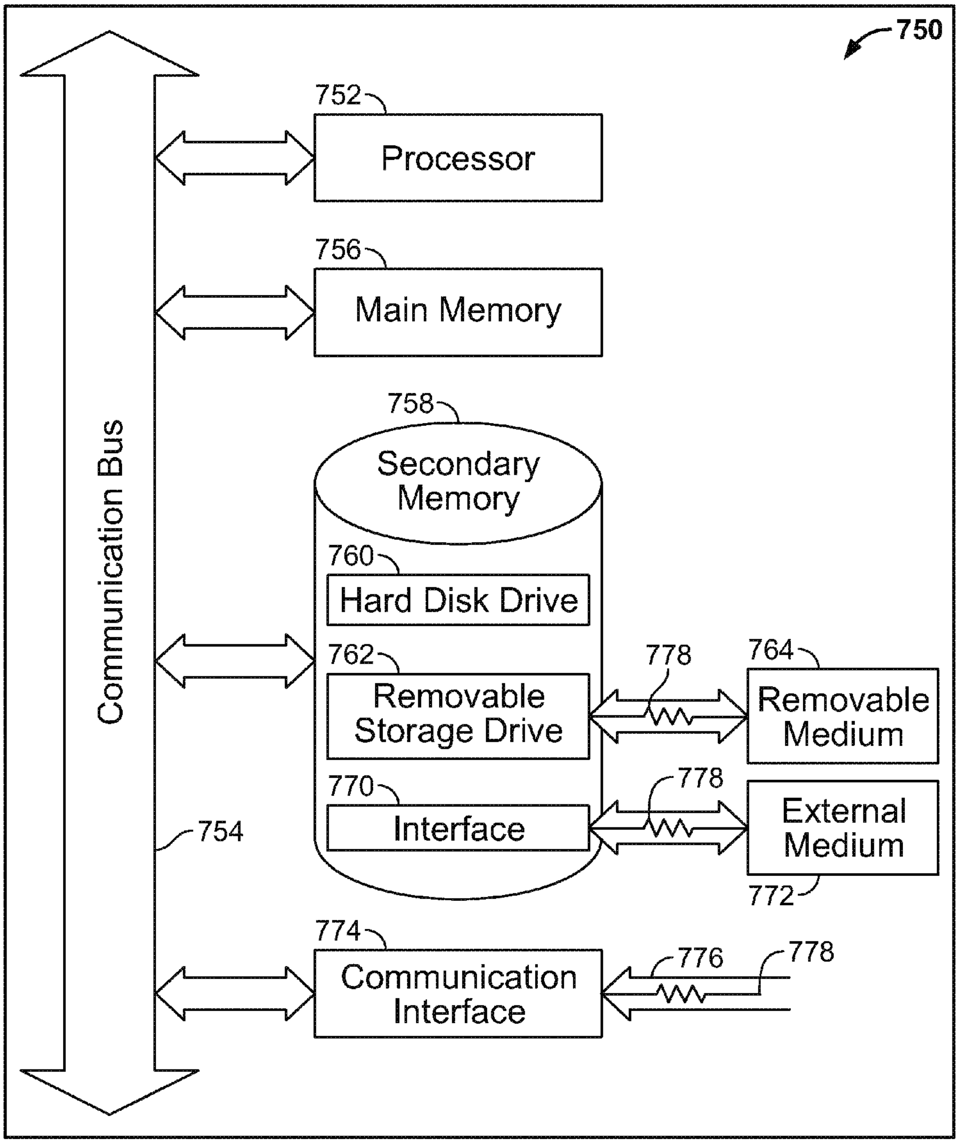
FIG. 3 is a block diagram of a conventional computing device suitable for executing the method described herein.
Figure 4:
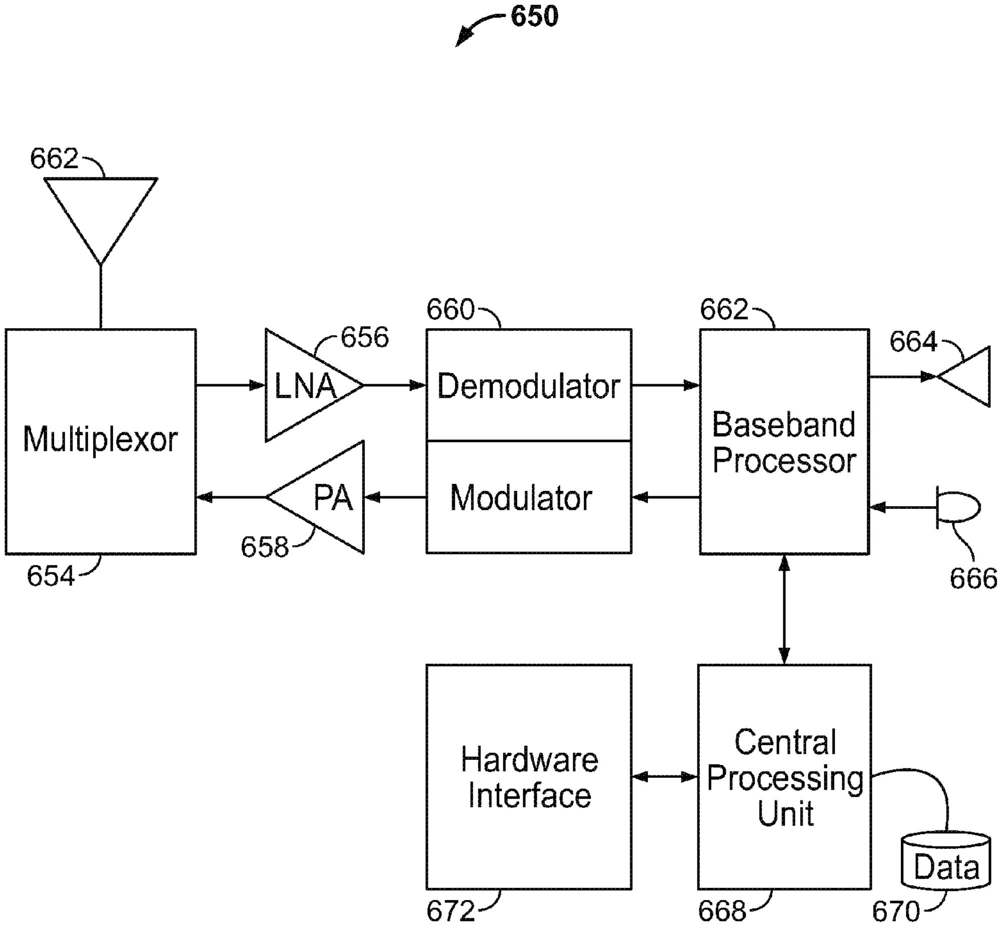
FIG. 4 is a block diagram of a conventional wireless communications device suitable for communicating between the event detector of FIG. 2 and a remote base unit.

FIG. 3 is a block diagram of a conventional computing device 750 suitable for executing the method described hereinbelow. For example, the computer system 750 may be used in conjunction with an event detector previously described with respect to FIGS. 1 and 2, or an evaluation server, analysis station, counseling station, or supervisor station described in the Prior Applications. However, other computer systems and/or architectures may be used, as will be clear to those skilled in the art.

The computer system 750 preferably includes one or more processors, such as processor 752. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 752.

The processor 752 is preferably connected to a communication bus 754. The communication bus 754 may include a data channel for facilitating information transfer between storage and other peripheral components of the computer system 750. The communication bus 754 further may provide a set of signals used for communication with the processor 752, including a data bus, address bus, and control bus {not shown). The communication bus 754 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, mini PCI express, or standards promulgated by the Institute of Electrical and Electronics Engineers ("IEEE") including IEEE 488 general-purpose interface bus ("GPIB"), IEEE 696/S-100, and the like.

Computer system 750 preferably includes a main memory 756 and may also include a secondary memory 758. The main memory 756 provides storage of instructions and data for programs executing on the processor 752. The main memory 756 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 758 may optionally include a hard disk drive 760 and/or a removable storage drive 762, for example a floppy disk drive, a magnetic tape drive, a compact disc ("CD") drive, a digital versatile disc ("DVD") drive, etc. The removable storage drive 762 reads from and/or writes to a removable storage medium 764 in a well-known manner. Removable storage medium 764 may be, for example, a floppy disk, magnetic tape, CD, DVD, memory stick, USB memory device, etc.

The removable storage medium 764 is preferably a computer readable medium having stored thereon computer executable code (i.e., software) and/or data. The computer software or data stored on the removable storage medium 64 is read into the computer system 750 as electrical communication signals 778.

In alternative embodiments, secondary memory 758 may include other similar means for allowing computer programs or other data or instructions to be loaded into the computer system 750. Such means may include, for example, an external storage medium 772 and an interface 770. Examples of external storage medium 772 may include an external hard disk drive or an external optical drive, or an external magneto-optical drive.

Other examples of secondary memory 758 may include semiconductor-based memory such as programmable read-only memory ("PROM"), erasable programmable read-only memory ("EPROM"), electrically erasable read-only memory ("EEPROM"), or flash memory. Also included are any other removable storage units 772 and interfaces 770, which allow software and data to be transferred from the removable storage unit 772 to the computer system 750.

Computer system 750 may also include a communication interface 774. The communication interface 774 allows software and data to be transferred between computer system 750 and external devices (e.g., printers), networks, or information sources. For example, computer software or executable code may be transferred to computer system 750 from a network server via communication interface 774. Examples of communication interface 774 include a modem, a network interface card ("NIC"), a communications port, a PCMCIA slot and card, an infrared interface, and an IEEE 1394 fire-wire, just to name a few.

Communication interface 774 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 774 are generally in the form of electrical communication signals 778. These signals 778 are preferably provided to communication interface 774 via a communication channel 776. Communication channel 776 carries signals 778 and can be implemented using a variety of wired or wireless communication means including wire or cable, fiber optics, conventional phone line, cellular phone link, satellite link, wireless data communication link, radio frequency (RF) link, or infrared link, just to name a few.

Computer executable code (i.e., computer programs or software) is stored in the main memory 756 and/or the secondary memory 758. Computer programs can also be received via communication interface 774 and stored in the main memory 756 and/or the secondary memory 758. Such computer programs, when executed, enable the computer system 750 to perform the various functions of the present invention as previously described.

In this description, the term "computer readable medium" is used to refer to any media used to provide computer executable code (e.g., software and computer programs) to the computer system 750. Examples of these media include main memory 756, secondary memory 758 (including hard disk drive 760, removable storage medium 764, and external storage medium 772), and any peripheral device communicatively coupled with communication interface 774 (including a network information server or other network device). These computer readable mediums are means for providing executable code, programming instructions, and software to the computer system 750.

In an embodiment that is implemented using software, the software may be stored on a computer readable medium and loaded into computer system 750 by way of removable storage drive 762, interface 770, or communication interface 774. In such an embodiment, the software is loaded into the computer system 750 in the form of electrical communication signals 778. The software, when executed by the processor 752, preferably causes the processor 752 to perform the inventive features and functions to be described hereinbelow.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality invarying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such that the processor can read information from, and write information to, the storage medium. In the alternative, the storage medium can be integral to the processor. The processor and the storage medium can also reside in an ASIC.

FIG. 4 is a block diagram of a conventional wireless communications device 650 suitable for communicating between the event detector 30A of FIG. 2 and a remote base unit. For example, the wireless communication device 650 may be used in conjunction with an event detector previously described with respect to FIGS. 1 and 2, or an evaluation server, analysis station, counseling station, or supervisor station previously described in the Prior Applications. However, other wireless communication devices and/or architectures may also be used, as will be clear to those skilled in the art.

In the illustrated embodiment, wireless communication device 650 comprises an antenna 652, a multiplexor 654, a low noise amplifier ("LNA") 656, a power amplifier ("PA") 658, a modulation/demodulation circuit 660, a baseband processor 662, a speaker 664, a microphone 666, a central processing unit ("CPU") 668, a data storage area 670, and a hardware interface 672. In the wireless communication device 650, radio frequency ("RF") signals are transmitted and received by antenna 652. Multiplexor 654 acts as a switch method to couple two or more transmit and receive paths to two or more antennae paths, coupling antenna 652 between the transmit and receive signal paths. In the receive path, received RF signals are coupled from a multiplexor 654 to LNA 656. LNA 656 amplifies the received RF signal and couples the amplified signal to a demodulation portion of the modulation circuit 660.

Typically modulation circuit 660 will combine a demodulator and modulator in one integrated circuit ("IC"). The demodulator and modulator can also be separate components. The demodulator strips away the RF carrier signal leaving a base band receive audio/data signal, which is sent from the demodulator output to the baseband processor 662.

If the baseband receive audio signal contains audio information (or really any data in the digital domain), then baseband processor 662 decodes the signal and converts it to an analog signal. Then the signal is amplified and sent to the speaker 664. The baseband processor 662 also receives analog audio signals from the microphone 666. These analog audio signals are converted to digital signals and encoded by the baseband processor 662. The baseband processor 662 also codes the digital signals for transmission and generates a baseband transmit audio signal that is routed to the modulator portion of modulation circuit 660. The modulator mixes the baseband transmit audio signal with an RF carrier signal generating an RF transmit signal that is routed to the power amplifier 658. The power amplifier 658 amplifies the RF transmit signal and routes it to the multiplexor 654 where the signal is switched to the antenna port for transmission by antenna 652.

The baseband processor 662 is also communicatively coupled with the central processing unit 668. The central processing unit 668 has access to a data storage area 670. The central processing unit 668 is preferably configured to execute instructions (i.e., computer programs or software) that can be stored in the data storage area 670. Computer programs can also be received from the baseband processor 662 and stored in the data storage area 670 or executed upon receipt. Such computer programs, when executed, enable the wireless communication device 650 to perform the various functions of the present invention as previously described.

In this description, the term "computer readable medium" is used to refer to any media used to provide executable instructions (e.g., software and computer programs) to the wireless communication device 650 for execution by the central processing unit 668. Examples of these media include the data storage area 670, microphone 666 (via the baseband processor 662), antenna 652 (also via the baseband processor 662), and hardware interface 672. These computer readable mediums are means for providing executable code, programming instructions, and software to the wireless communication device 650. The executable code, programming instructions, and software, when executed by the central processing unit 668, preferably cause the central processing unit 668 to perform the inventive features and functions previously described herein. It should be noted that the firmware used by the device 650 (or CPU 668) can be replaced/modified/upgraded via wired or wireless network transfer.

Figure 5:
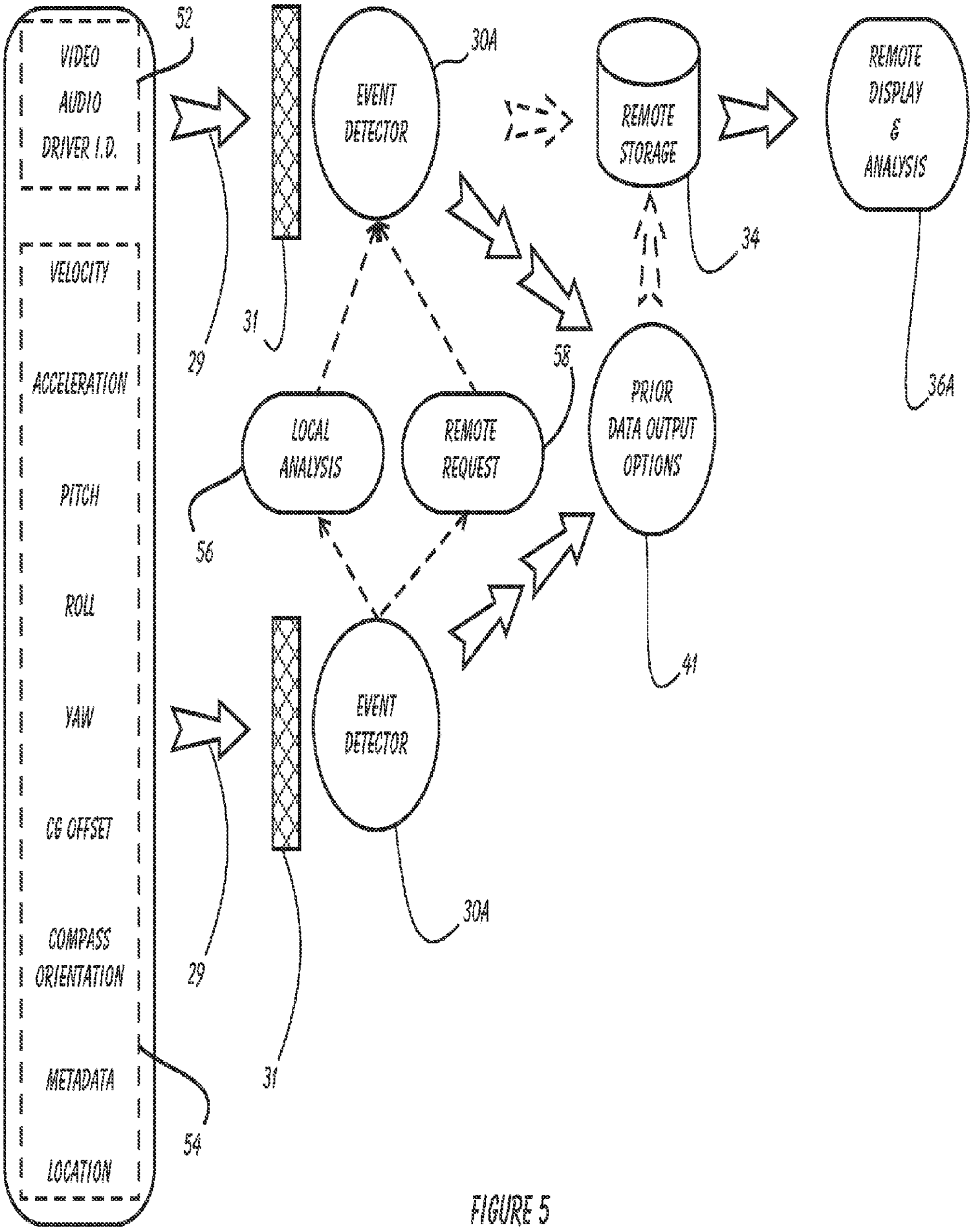
FIG. 5 is a block diagram depicting exemplary inputs to the event detector of FIGS. 1 and 2, and the potential response results and destinations for detected events.

The central processing unit is also preferably configured to receive notifications from the hardware interface 672 when new devices are detected by the hardware interface. Hardware interface 672 can be a combination electromechanical detector with controlling software that communicates with the CPU 668 and interacts with new devices. FIG. 5 depicts how the system of the present invention handles the data from the different sensor devices.

FIG. 5 is a block diagram depicting exemplary inputs to the event detector 30A of FIGS. 1 and 2, and the potential response results and destinations for detected events. The communications with an external evaluation server is extensively discussed in the Parent Applications, and is therefore not reproduced there, but is rather incorporated herein by reference.

As shown, event capture devices (including inputs from the OBD and other vehicle equipment) can generate captured event data for velocity, acceleration (linear), pitch, roll, and yaw. Center of gravity and CG offset may also be used. Vehicle orientation relative to compass heading, as well as vehicle location may be included in event data. Finally, audio, video and metadata (including driver ID) will likely be included.

The captured data 29 may be filtered by a real-time tunable raw data filter 31 before it is analyzed by the event detector 30A to determine whether or not a driving event of note has occurred. The criteria for making a type of driving event of note could be user-defined for their particular reason; such events of note may or may not otherwise be considered to be risky driving events, but are otherwise of interest to the user.

As discussed above in connection with FIG. 2, different types of sensor data 29 will be handled in different manners by the present system. For the purpose of clarity, we have here divided the sensor data 29 into two groups of data: regularly uploaded data 54 and selectively uploaded data 52. The idea is that primarily the less bandwidth-demanding data is regularly uploaded to the remote server from the vehicle. The higher bandwidth data would be retained aboard the vehicle until it is manually requested, automatically identified as being "of interest", or for periodic record-keeping purposes (which very well may be accomplished via wired or wireless connection while the vehicle is under a maintenance status).

Here, the video and audio data and telemetry data have been included within the selectively uploaded data 52. As mentioned above, the expectation would be that this data would not normally be included in the regular wireless data flow from the event detector 30A to the remote server unless certain conditions are met. Since the audio and particularly the video data demands large bandwidth for transfer, the data of these streams would generally be stored locally. Driver ID is also included within the selectively uploaded data 52, since the objective evidence of the driver's identity (such as a video clip) may not be obtained until commanded as such by the event detector 30A (such as right after the local event scoring module 140 (see FIG. 2)) determines that an event of interest has transpired. At that point, any remote user receiving the video and audio data would most likely be very interested in confirming the identity of the driver (since the goal would be to transfer the data 52 when there is a vehicular crash or near miss).

One factor that might be used to determine whether or not "an event of interest" has transpired is related to the nature of the forces (i.e., of the accelerometer) being sensed. Certain forces (e.g., shock) have been identified as being automatically "of interest," even without any real onboard analysis of the entire set of data streams being analyzed.

The regularly uploaded data 54 is handled as discussed in the prior applications that is, initial filtering 31 may be performed on the data in order to reduce false event occurrences. The event detector 30A will convey the regularly uploaded data 54 as described in the Parent Applications (incorporated herein by reference) and identified as the prior data output options 41 (summarized below in connection with FIG. 6).

If activated, the local event scoring module 140 (see FIG. 2) will conduct local analysis 56 of the regularly uploaded data 54 in order to calculate a local event score. If the local event score so determines, the selectively uploaded event data 52 will be transmitted to remote storage 34 (at the remote server) for display/review/analysis (e.g., scoring) remote to the vehicle.

A remote request 58 (from a remote user or system) will also trigger the data 52 to be uploaded to remote storage 34 for remote display and analysis 36A. As should be apparent, those transfer paths responsive to the local analysis 56 or remote request 58 are identified by dashed lines.

It should be understood that the depicted classifications of data as being part of the "selectively uploaded" data 52 versus the "regularly uploaded" data 54 is only one possible arrangement. In other forms, and when certain system settings are chosen, the system (either the local system aboard the vehicle or the remote server) may send one or more designated persons a message (email, SMS, etc.) that will include a brief alert message that there has been an "incident" in a vehicle (or more than one vehicle). The user may then be able to select a "hyperlink" that will act as a user request to download the selected data from the system (either the vehicle or the central remote server or related assemblies). The data being downloaded in response to the user request would normally be video and/or audio data, but it could also include other data points or data streams, such as vehicle location coordinates (e.g., via GPS), incident type or classification (e.g., "crash," "vehicle flipover," "excessive speed," etc.).

Furthermore, the user's request after being alerted of the incident may either be serviced by the remote server system or by the vehicle-borne system. As such, the selectively uploaded data 52 may not be uploaded to the server until after a user has requested it. Also, the alert message to the user (which usually would not include any large bandwidth, selectively uploaded data 52) may have more than one data upload option. For example, the user may be given the options of: (a) uploading a short video clip including vehicle GPS location and speed; (b) uploading actively streaming video and audio directly from the vehicle; or (c) uploading current video/audio data plus similar data from some period of time prior to the incident having occurred.

If neither the local analysis 56 nor remote request 58 is received by the event detector 30A, then the data 52 will be handled according to the prior data output options as more fully described below in connection with FIG. 6.

Figure 6:
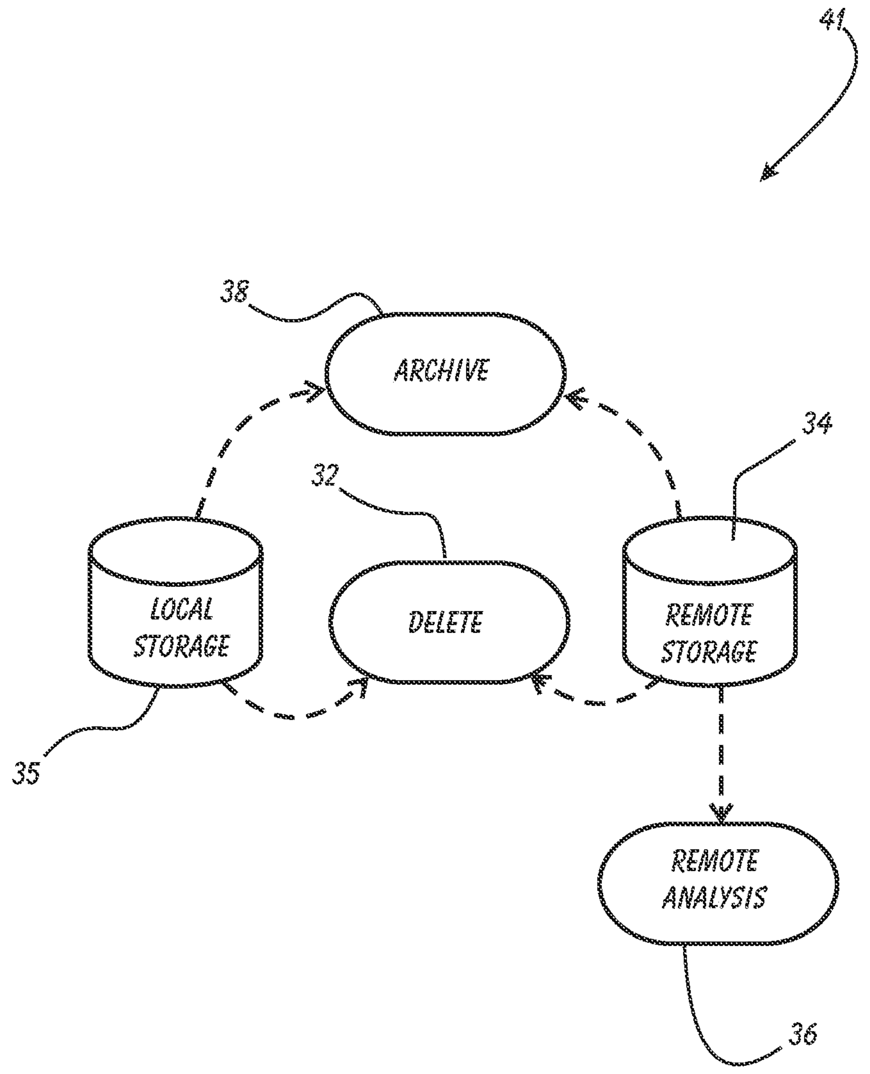
FIG. 6 is a block diagram of the prior data output options available to the event detector.

FIG. 6 is a block diagram of the prior data output options 41 available to the event detector 30A (see FIG. 5). As events are detected by the event detector 30A (see FIG. 5), captured event data can be output in accordance with a number of options 41, including placement in a local storage repository 35. Transmission to a remote storage repository 34 may also occur, either automatically, or in response to user request. Furthermore, there may be a blend of local storage and partial transmission to remote storage 34. Remote analysis 36 can be conducted on remotely stored data as desired by the system custodian or other authorized individuals. Of course, it is also expected that a certain quantity of data that is initially stored locally and/or remotely will ultimately he deleted 32 in order to conserve space in the respective data repositories. A remote archive data repository 38 is a potential destination for some of the data initially held in the local or remote data repositories 35, 34. These storage options 41 are operationally distinct from those discussed above in connection with FIG. 5, but they generally will use the identical hardware—these two drawing figures are organized as shown in order to highlight the operational distinctions between the handling of the selectively uploaded data 52 and the regularly uploaded data 54 (see FIG. 5). Now turning to FIG. 7, we can examine the method that the system of the present invention executes.

Figure 7:
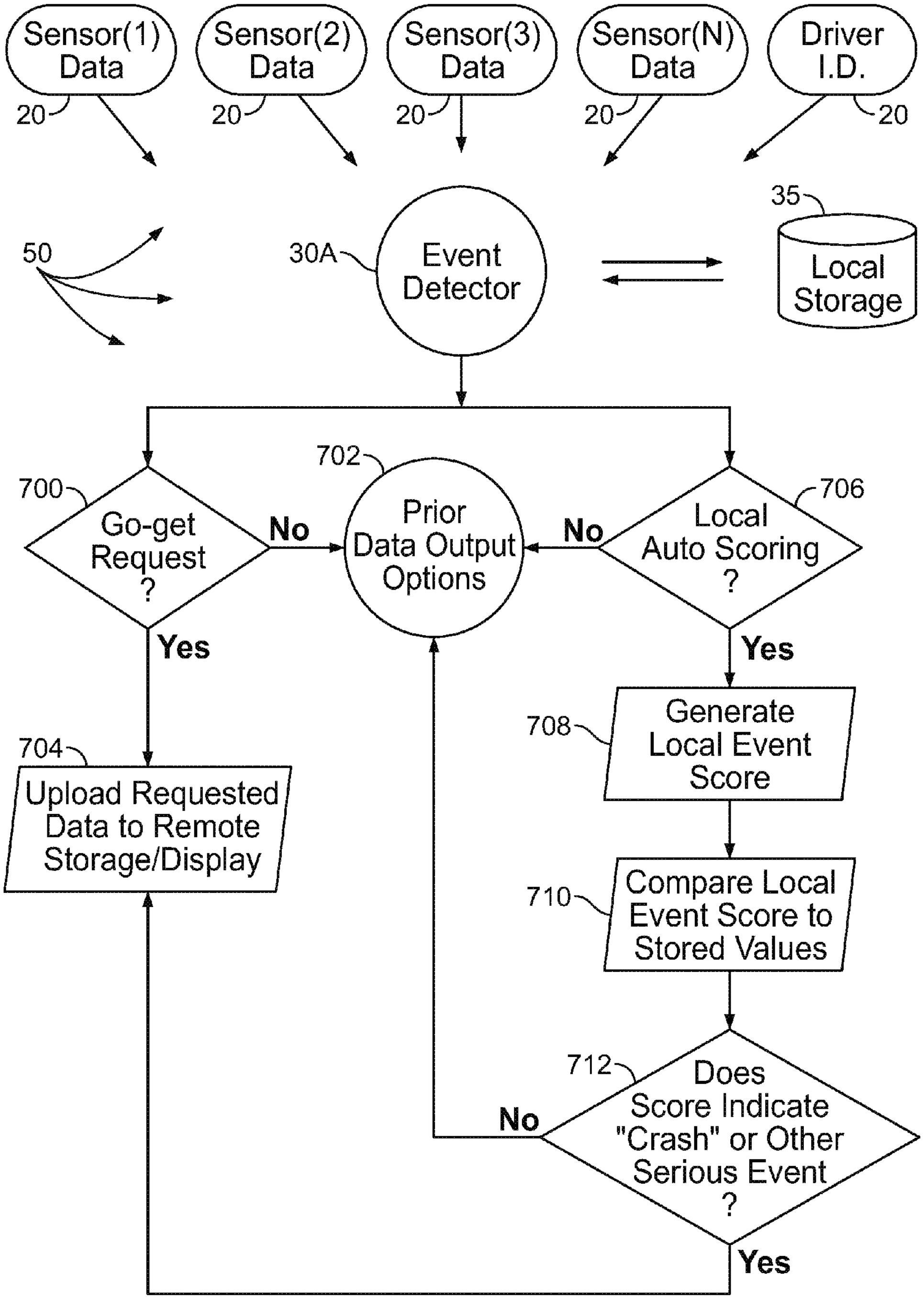
FIG. 7 is a block diagram depicting the preferred steps of the selectively automatic event scoring method 50 of the present invention.

FIG. 7 is a block diagram depicting the preferred steps of the selectively automatic event scoring method 50 of the present invention. The sensor data 20 is received by the event detector 30A (potentially after filtration of the raw data). This data is buffered and stored for more prolonged periods in local storage 35 aboard the vehicle.

If a remote ("go-get") request 702 is received by the event detector 30A, the requested data will be uploaded from the event detector 30A to the remote server for storage/analysis/display 704. Similarly, if local auto scoring 706 is activated, the system will generate a local event score 708. That local event score is then compared to a series of previously stored event score values (typically in a database) 710, to generate an automatic determination of whether or not a serious driving event (e.g., a vehicular crash) has occurred 712. If the local event scoring module 140 (see FIG. 2) determines that a serious event has occurred, then the selectively-uploaded data 52 (see FIG. 5) is uploaded to the remote server 704. As discussed above, if there is no remote request 700 or local score-triggered upload 706, the data will be handled according to prior data output options 702.

In previous embodiments of the driver event scoring system described in the patent applications from which the instant application continues (the "parent applications"), much of the value and robustness of the system output was rooted in the fact that all "events" as identified by the event detectors 30 were reviewed manually prior to their "official" identification as "events of interest." In the prior systems, this manual process was conducted by human beings individually reviewing "clips" of event data (e.g., video, audio, vehicle location, OBD, velocity, acceleration forces) and then assigning a "score" to these "clips." A score (in the prior system, and also in the system of the present invention) is an assessment as to the "riskiness" of the driving behavior identified as an event. This "post-processing" was conducted because the prior systems' automated triggering and analysis could not be counted upon to provide acceptable reliability in their assessment to the user/customer without final human review and scoring of the event that was identified by the sensors and event detector. This environment has now changed; the evidence is the system and method of the present invention.

While the basic arrangement of sensors, local analysis of the sensor data, and the identification of "driving events" has remained largely unchanged as compared to the prior systems, the event scoring approach has changed drastically. An optional automated event scoring capability has been added to the prior system that, as will be detailed below, is capable in the long term of providing virtually the same robust, reliable event scoring as does the manual event scoring approach taken previously. Consequently, using the current system and method, "events" as identified by the present risk assessment and automated scoring system are reliably "real" events that are indicative of risky or vehicle behavior. The present improvement can best be understood by initial consideration of FIG. 8.

Figure 8:
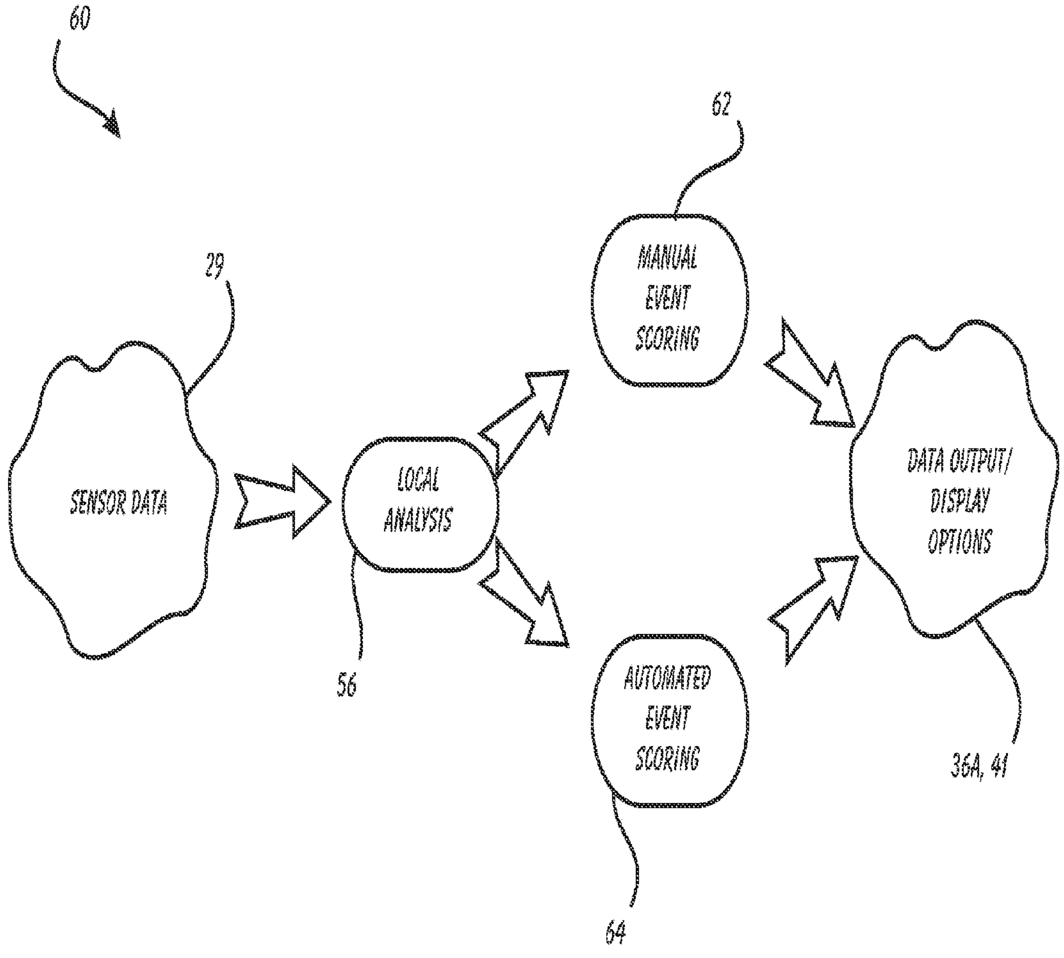
FIG. 8 is a functional block diagram of a preferred embodiment of the system and method of the present invention.

FIG. 8 is a functional block diagram of a preferred embodiment of the system and method 60 of the present invention. When one or more appropriate trigger threshold(s) are reached by the vehicle sensors, data 29 from some or all of the sensors is transmitted to the event detector (aboard the vehicle) for local analysis 56. Subsequently, if appropriate, the event detector transmits event data (ODB, video, audio, metadata, etc.) to the manual event scoring module 62 and/or the automated event scoring module 64.

Manual event scoring 62 is conducted by human review of the data "clips" received from the event detector. Generally this is at a workstation at a location that is remote from the vehicle, although it may also be conducted within the vehicle itself once the event "clips" have been viewed and reviewed. Furthermore, in certain embodiments, event data "clips" can be reviewed and scored by a human being at virtually any portable computing device, including cellular telephones and the like.

Automated event scoring 64 can also be conducted within a computing device that is remote to the reporting vehicle, as well as at virtually any portable computing device. What is most likely, however, is that the event detector itself includes the automated scoring module within the same system (and perhaps physical housing) as the other functional modules of the event detector (see FIGS. 1 and 2). Scoring the events "on the fly" within the actual vehicle being monitored optimizes the overall driver risk assessment system in several ways. First, as will be discussed further below, each event has been scored before any data has been transmitted from the vehicle to a remote location—this reduces wireless transmission bandwidth by allowing the system to act and react to the type and severity of events from the earliest possible place in the data analysis stream, so as to handle the event data transmission in a custom manner each and every time. Second, human review of event data tends to be fairly expensive to apply to all driving events—having an automated scoring system that is regularly re-calibrated will reduce the need for human review in order to have acceptable levels of event reporting accuracy. Third, automated event scoring tends to accelerate the speed of distribution of event data for "risky" events—this insures that customers will have as much reaction time as possible in order to potentially minimize the downstream effects on their operation from the occurrence of risky events.

Figure 9:
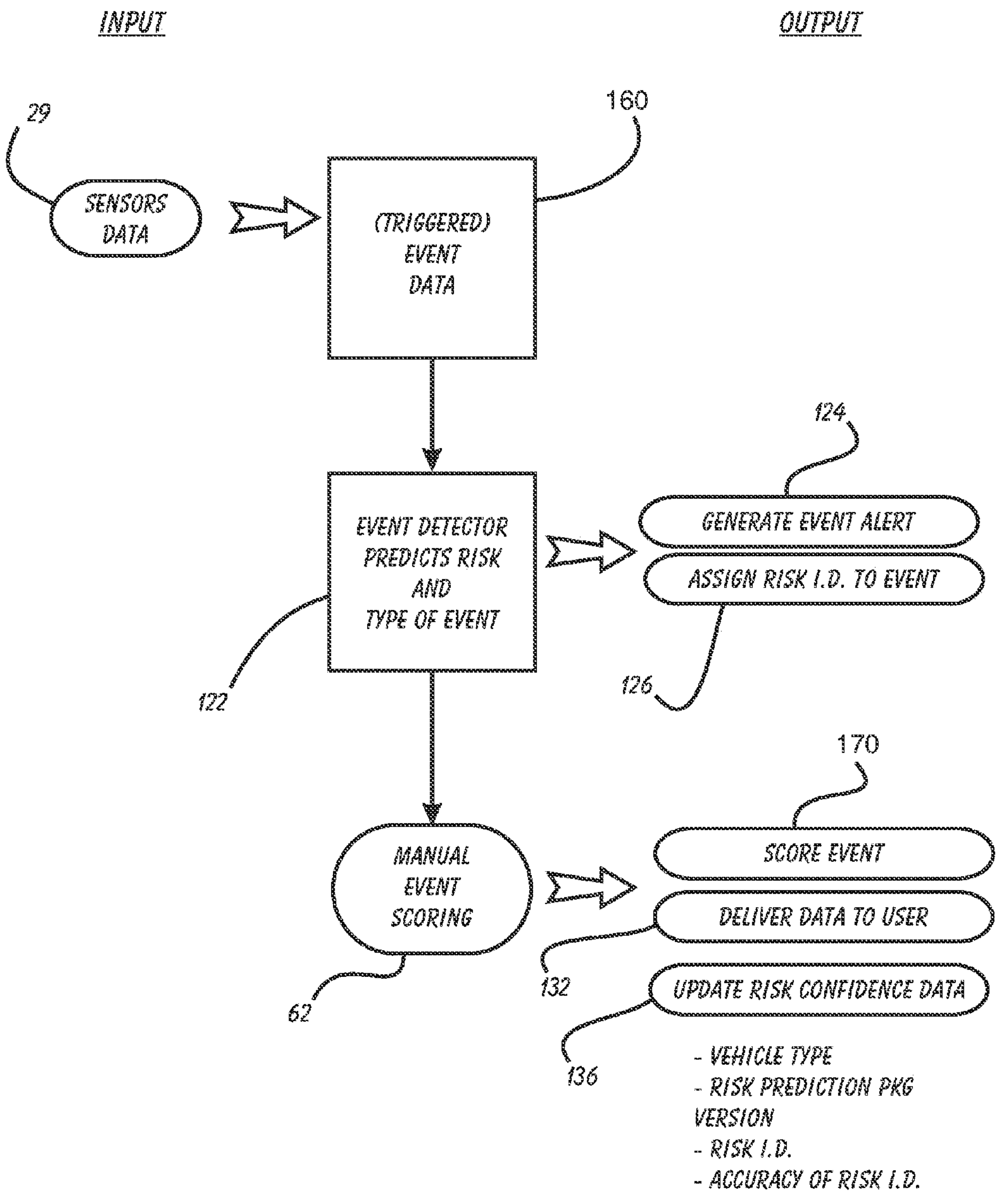
FIG. 9 depicts the sequence of steps of the manual event scoring portion of the system of the present invention.

Under this advanced system, virtually the same data output/display options 36A and 41 of the event data are available as were available in the prior systems. Turning to FIG. 9, we can begin to discuss the operation of this new system and method.

FIG. 9 depicts the sequence of steps of the manual event scoring portion 62 of the system of the present invention. The sensors (see FIG. 1) feed data 29 to the event detector. When one or more of these sensors reaches or exceeds (or falls below) a pre-set threshold, an "event" is considered to have happened. This "trigger" results in the sensor data 29 being saved by the event detector (e.g., transferred from memory buffer to a longer-term memory storage area) 160. The event detector then applies an analytic method to the triggered sensor data (or "clips") 122 to immediately predict what type of risky driving event has occurred (e.g., crash, excessive braking, hard cornering).

The output of step 122 typically includes an event alert 124 that could be in a variety of forms (as discussed in the parent of this CIP Application). For example, the customer could receive an instant message, email or other notification of the event's occurrence. Of course, there could be local notification (i.e., within the vehicle) of the event occurrence, just to insure that the driver is aware that the system has acted.

The event detector will also assign a predicted risk identification to the event At this stage, the risk is only considered to be predicted because all of the analytical study has been done by the event detector and/or sensors as a result of "triggers." While sensor data-based triggers will reliably detect "events" from the raw (or filtered) sensor data, the problem is that there is a tendency to substantially "over-report" events. That is to say that not every "event" that is predicted to have occurred actually turns out to be risky driving behavior once it is reviewed in detail. If there is too much over-reporting, the user tends to be desensitized, with the result being the ignoring of events reported by the system. It is for this reason that the system has historically included manual event scoring.

The risk identification 126 assigned to the event (or predicted event) is very critical. It is one of a series of discrete "nodes" or identity results that is reached after the sensor data is analyzed by the event detector. The nodes or ID's are the result of the processing and analyzing of mass quantities of actual driving events (or suspected driving events). A predicted event is in actuality confirmed as an actual risky driving event in a significant portion of cases. This is evidenced in that the "tree" of nodes through which the sensor data is processed is of non-trivial value, and is actually quite successful at filtering out real sensor data (really combinations of data) to arrive at a defined type of risk that is represented by the predicted event. Note is made here that when we speak of risk ID, we do not mean a sequential identifier intended to point to a single discrete "event," but rather we are speaking of assigning a pre-existing risk identification (one of a group of possible risk identities) to the event data triggered by the sensors and/or event detector.

Manual event scoring 62 is conducted by human review of the predicted events generated by the event detector/sensors. In assigning the predicted event score, the human reviewer will review each and every "clip" of data recording the "event," including accelerometer, GPS, OBD, video, audio and others according to the invention as previously described. In particular, the human reviewer/scorer will view the actual video of the driver and potential exterior area surrounding the vehicle, just prior to, during, and just after the predicted event has occurred. This video review virtually transforms the human reviewer into a witness to the incident. As such, there is an extremely high level of confidence that the reviewer will certify (or decertify) the predicted event as a true event. Furthermore, the reviewer will be able to assign a risk severity to the reviewed event—each "type" of event (e.g., hard braking, swerving, etc.) will have a severity quotient (e.g., not all bard braking events are of the same severity and therefore riskiness).

Historically, the results of human review of actual event data was only applied indirectly to the event detector's prediction method and system via irregularly scheduled "releases" of system upgrades. Now, with the current autoscoring embodiment, there is regular "re-calibration" of the automatic scoring parameters and settings so that the automated scoring method continually improves its accuracy with regularity.

Figure 10:
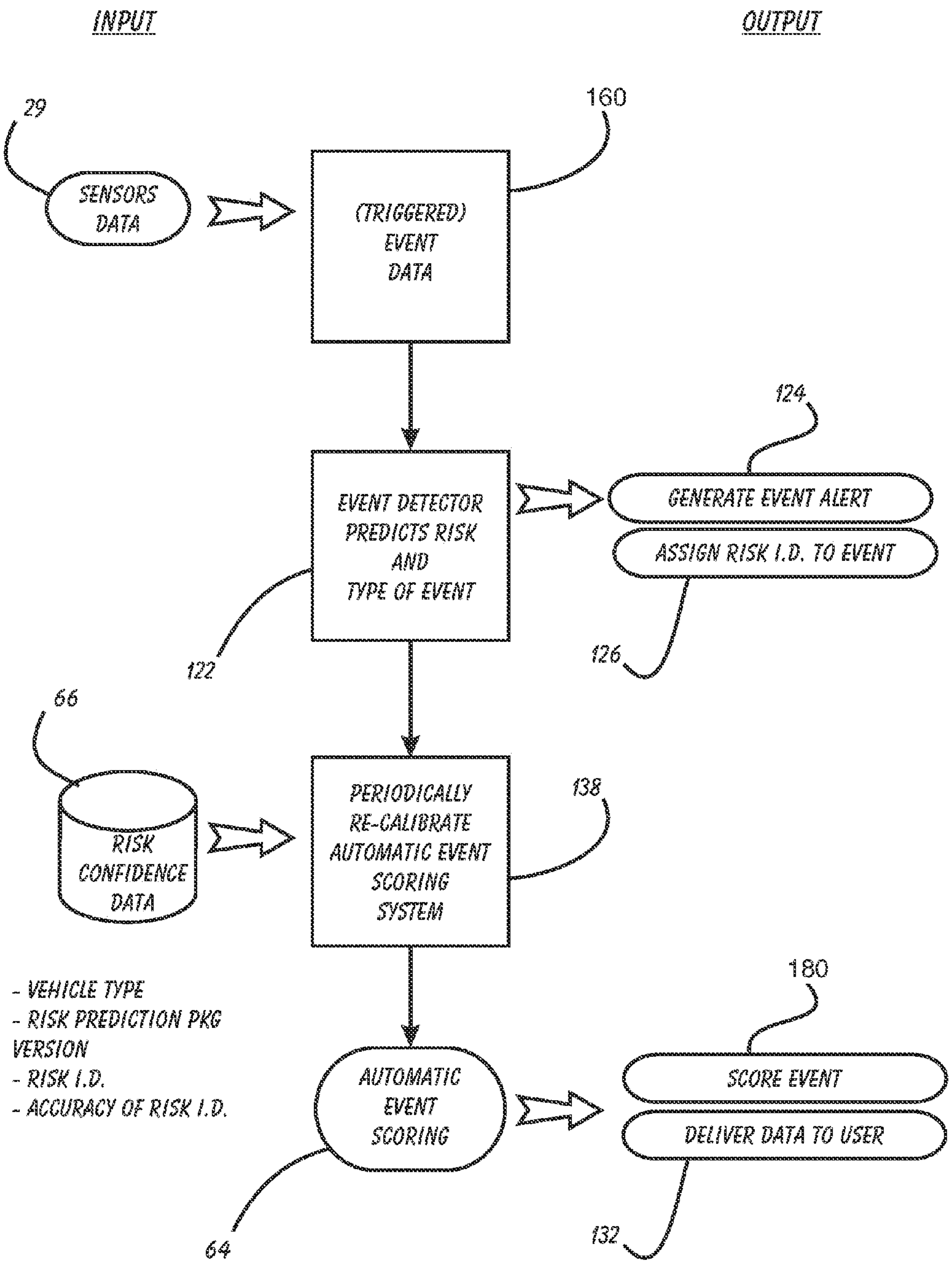
FIG. 10 depicts the sequence of steps of the automated event scoring portion of the system of the present invention.

The manual scoring of an event creates a series of outputs. An event score is produced 170. That score is delivered, perhaps along with some or all of the sensor data (e.g., video) to the user 132. Finally, the system compares the result of the manual scoring to the predicted scoring result, and the data representing the confidence level of the risk identity prediction is updated to include this final score 136. The output data includes the vehicle type (which affects the version of risk prediction system choice), the version of risk prediction package that generated the predicted event, the identity of the final risk as scored, and the accuracy of the predicted risk vs. the final scored risk (accuracy both a percent accurate to identity, as well as the severity of the scored vs. predicted risk). Ultimately, the central instantiation of the risk prediction decision tree data will be updated each time a manual event score is completed. Predicted risks having high levels of confidence in accuracy regarding identity/type and severity will continue to evolve as the results of the comparison to actual (i.e., manual) scoring are applied. FIG. 10 depicts the sequence followed by the new method.

FIG. 10 depicts the sequence of steps of the automated event scoring portion 64 of the system of the present invention. The initial steps of the automatic scoring sequence are essentially the same as the manual scoring sequence previously described. The sensors data 29 is supplied to the event detector in response to a sensor or event detector trigger. The triggered event data 160 is analyzed by the event detector and risk and type of event are predicted 122. An event alert 124 is initiated (which might be only an internal "system" alert). A risk identity LD. is assigned to the event 126.

Skipping to step 64, the automatic event scoring module examines the predicted event risk and generates an event score 180, and delivers it to the user 132 in essentially the same fashion (and with the same options) as the manual event scoring method.

What is new is that on a regular basis, the automated event scoring module is re-calibrated with updated confidence data from new manually-scored events 138. Each time a new predicted event is manually scored, the reliability/accuracy rate of the event identification and the severity is updated. As each risk I.D. (per vehicle type) is populated with new confidence data, risk confidence data 66 is updated.

The data records contained within the risk confidence data repository tend to be very small in size because these are essentially control parameters used in the automatic scoring module. The event detector in the average installation will establish communications at least once a day with the remote server system in order to verify operability, and at times to transfer event data "clips" from the event detector to the remote system. At that time, it is a simple matter for the newest version of the risk confidence data to be uploaded and implemented in the automatic scoring module at the vehicle. Alternatively, where the automatic scoring module is a part of the remote server system, updates may be on a more regular basis.

Figure 11:
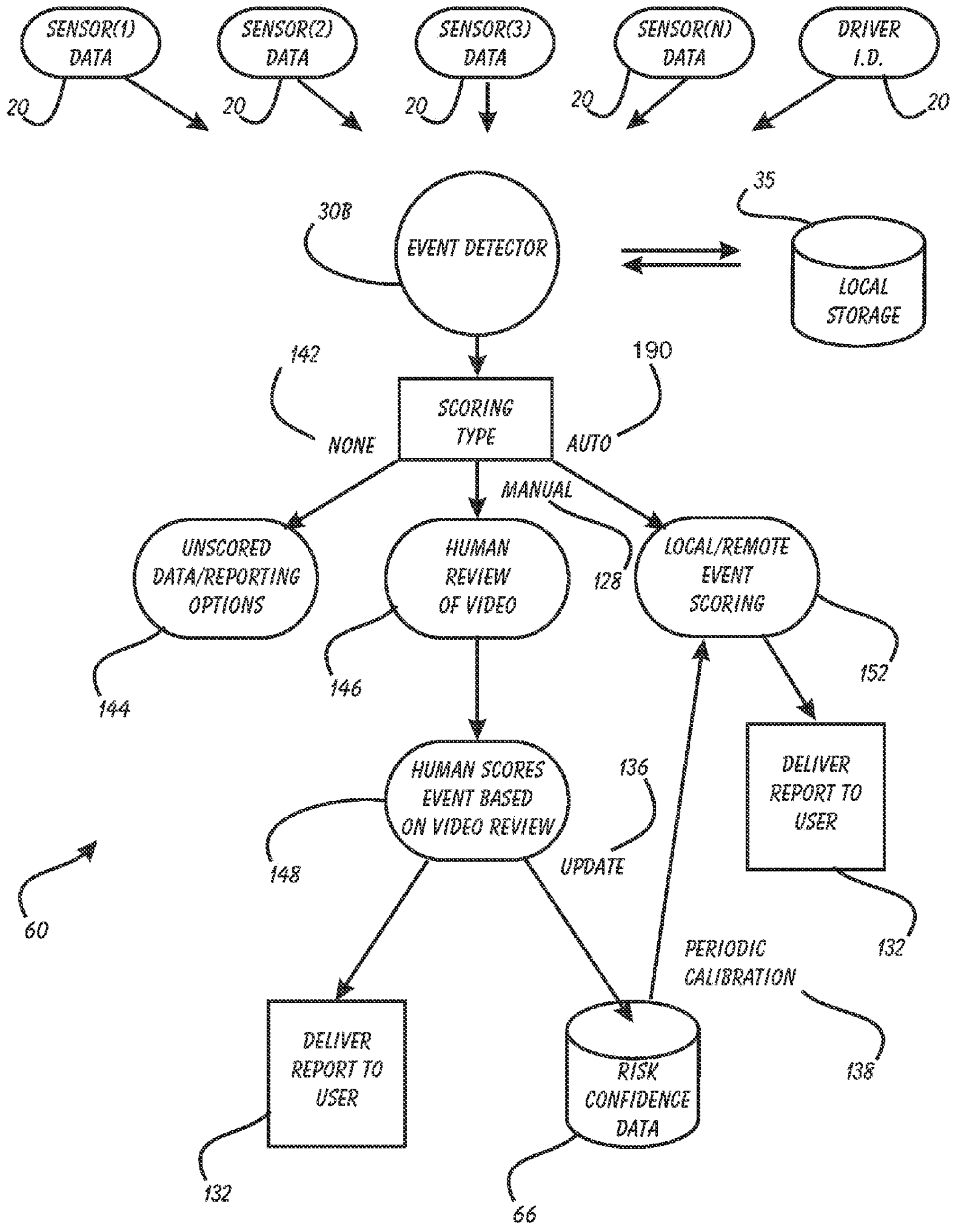
FIG. 11 is a flowchart depicting the progression of steps in the method of FIGS. 8-10.

FIG. 11 is a flowchart depicting the progression of steps in the method 60 of FIGS. 8-10. The event detector 30B receives data from each of its associated sensors 20 while the vehicle is active (powered on). On an ongoing basis, the event detector 30B will buffer data locally, and will also store buffered data from all sensors 20 in local storage 35 upon receipt of data exceeding a trigger threshold (or an actual trigger signal) from one or more sensors 20.

The event detector 30B will analyze the data from the sensors 20 by applying a pre-established set of data analytics (e.g., a decision tree) to the data. This tree is the result of a long-term study of vehicular sensors and their responses during thousands of miles of monitored driving. Each vehicle type has, in effect, its own particular decision tree; updated versions of the trees are released with historical and/or equipment or software upgrades. The data from any triggered event passing through the risk prediction "tree" will arrive at a "node." The node is the far end of the decision tree for that particular combination of values emanating from the sensor data 20. It should be understood that raw sensor data may undergo statistical or other analysis in order to be usable by the risk prediction tree. For example, rate of change of a particular data value may be the operative characteristic used to navigate the tree, rather than the raw sensor value itself. The node at which the data ultimately "exits" the tree has been previously labeled herein as the "Risk I.D.". This Risk I.D., while expected to be a much more accurate prediction of a risky driving event than is the sensor triggered event identification, will still require downstream processing in order to obtain acceptable levels of reliability in the identification of risky driving events. The subsequent systematic actions will depend upon the type of scoring that has been elected. While not typical, it is possible that no scoring is desired 142. Under such circumstances, which might be diagnostic nature, the data/reporting options 144 would generally include the transfer of sensor/event data to a remote data storage repository for detailed analysis. Since significant over-reporting of "events" (i.e., the identification of events that aren't really risky driving events) is expected without event scoring, the volume of reports would be substantial, and very likely would only be useful to study the operability of the sensor triggers, or under special circumstances where heightened surveillance is more important to the end-user than is the problems associated with the deluge of information.

If manual scoring 128 is elected, the video (and accompanying data) related to the "event" is reviewed at a data review station (generally remote to the vehicle, but also could be local) by a human reviewer 146. The human review of the video and other data will result in an event score 148. As discussed above in connection with FIGS. 9 and 10, the output from the manual review of the event will include: vehicle type (e.g., bus, passenger car, dump truck, etc.), the version of the risk prediction decision tree, the Risk Identification (or node) identified by the Event Detector 30B, and a point value (on a predetermined scale) that assesses the riskiness of the driver's behavior during the event. If, after manual human review, the scored event meets the appropriate criteria, the event is reported to the user 132.

Another byproduct of the manual human event review of the data of predicted events is to update 136 the risk confidence data repository 66. Generally, the results of each manually-scored event will be applied to the existing risk confidence data 66. Each "node" or Risk I.D. has a profile associated with it. The profile includes the vehicle type, the risk prediction version, and the risk I.D. Through updates 136, the statistical reliability of the appropriate risk I.D. profile is assessed. That is to say that there is an ongoing reliability analysis that indicates how often the human reviewer actually identified that there was a risky driving event (as a percentage of all times that this particular risk I.D. was identified), as well as what the typical or expected severity of the risk has historically been (and therefore is expected to be).

The risk confidence data 66 is then periodically updated 138 within the automated scoring module (whether local or remote to the vehicle). These regular updates are labeled as calibrations because they actually serve to further filter out non-events from the predicted events based on the confidence level in the predicted risk I.D. For example, if, historically, a particular risk I.D. (e.g., unsafe lane change in a dump truck) has only very infrequently been verified as being risky by manual human review, then it would be statistically irresponsible to automatically treat such a risk I.D. as an actual driving event.

Consequently, under such circumstances, the automatic scoring module will not normally deliver an event report to the user, since the likelihood that there was a real risky driving event (or one of substantial severity) is too low to be reliable. Of course, this score reliability filtration of events is adjustable so that the full range of system sensitivities is available.

If automated event scoring 190 is selected, risk confidence data 66 (as the automatic scoring module has been most recently calibrated) for the predicted risk I.D. is applied 152, and if there is sufficient reliability (in frequency and severity) as pre-set in the system, the user is delivered an event report 132. The event report options will generally match those options available for manual event scoring (since in both cases there is a high level of confidence that risky driving has occurred). It should be noticed that automatic scoring does not in actuality assign a score to a particular risk I.D. Instead, the automatic scoring module will determine whether the risk I.D. identified by the event detector 30B has a high enough expectation of reliability (as being risky), after which the automatic event scoring module confirms that a risky driving event has occurred. Automatic scoring, then, is more like noise filtration (i.e., elimination of non-events from user reports) than it is like manual human scoring (where a predicted risk I.D. is given a severity score by the human reviewer).

A final point can be made regarding the functionality of the system of the present invention. Clearly the manual human review of driving events is much more labor-intensive, and therefore more costly, than automated event scoring. Consequently, it is anticipated that only those risk I.D.'s that represent risky driving will generally undergo human review. On the contrary, however, automatic scoring will most likely be applied to all predicted events (risk I.D.s), whether risky or not. Under those circumstances, risk confidence data might be artificially created in order to support some particular administrative goal regarding the reporting (or non-reporting) of "non-risky" risk I.D.s.

Testing reveals that basic automatic scoring does substantially improve the reliability of the event reporting, even without any regular re-calibration to manual event I.D. accuracy data. With regular re-calibration of the automatic scoring event profiles based on actual manual event scores, the automatic scoring results have closely approached the accuracy and reliability of manual scoring (in the neighborhood of 93% accuracy).

Inpractice, the autoscore profiles are updated once per day, and then reviewed within twenty-four (24) hours to insure that the update does not create a problem or error. In order to reduce wireless transmission costs, it is typical that the profile update will be conducted in the evening when the vehicle is generally parked (and cellular telephone rates are reduced). Of course, this update periodicity can be adjusted in order to match the usage pattern of the vehicles and drivers of a particular fleet. Updates can also be selectively (manually) imposed by the system administrator, such as when system-wide upgrades are implemented.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. A system for automated event scoring, comprising:
- an automated scoring module for determining an automated score data;
- an event detector attached to a vehicle with one or more sensors, wherein the event detector comprises a processor configured for:
- receiving data from the one or more sensors;
- capturing driving event data associated with a driving event based at least on an event trigger using the one or more sensors;
- receiving a manual scoring data related to a previous driving event;
- calibrating the automated scoring module using the manual scoring data; and
- determining the automated score data for the driving event using the automated scoring module;
- determining whether a serious driving event has occurred based at least on the automated score data;
- in the event that a serious driving event has occurred, uploading the data to a remote server.

2. A system as in claim 1, wherein the manual scoring data comprises a risk severity.

3. A system as in claim 1, wherein the manual scoring data comprises an event type.

4. A system as in claim 1, wherein the manual scoring data comprises a vehicle type.

5. A system as in claim 1, wherein the manual scoring data comprises a version identifier.

6. A system as in claim 1, wherein the event detector is further configured to provide the automated score.

7. A system as in claim 1, wherein calibrating the automated scoring module comprises comparing a previous automated score related to the previous driving event with the manual scoring data.

8. A system as in claim 1, wherein determining the automated score data comprises using a risk prediction decision tree data.

9. A system as in claim 8, wherein calibrating the automated scoring module comprises updating the risk prediction decision tree data.

10. A system as in claim 1, wherein the processor is further configured to determine a reliability associated with the automated score.

11. A system as in claim 10, wherein the reliability comprises a reliability in frequency.

12. A system as in claim 10, wherein the reliability comprises a reliability in severity.

13. A system as in claim 10, wherein the processor is further configured to determine whether the reliability is sufficient to indicate to a user that data associated with the driving event is available.

14. A system as in claim 1, wherein calibrating is performed once per day.

15. A system as in claim 1, wherein calibrating is reviewed for problems or errors.

16. A method for automated event scoring, comprising:

receiving data from one or more data sensors coupled with an event detector attached to a vehicle;

capturing, using a processor coupled to the event detector, driving event data associated with a driving event based at least on an event trigger using the one or more sensors;

receiving a manual scoring data related to a previous driving event;

calibrating an automated scoring module using the manual scoring data;

determining an automated score data for the driving event using the automated scoring module;

determining whether a serious driving event has occurred based at least on the automated score data;

in the event that a serious driving event has occurred, uploading the data to a remote server.

17. A computer program product for automated event scoring, the computer program product being embodied in a non-transitory computer readable storage medium and comprising computer instructions for:

receiving data from one or more data sensors coupled with an event detector attached to a vehicle;

capturing driving event data associated with a driving event based at least on an event trigger using the one or more sensors;

receiving a manual scoring data related to a previous driving event;

calibrating an automated scoring module using the manual scoring data; and determining an automated score data for the driving event using the automated scoring module;

determining whether a serious driving event has occurred based at least on the automated score data;

in the event that a serious driving event has occurred, uploading the data to a remote server.

* * * * *